Feb. 18, 1930.  E. L. PETERSON  1,747,791
TRANSMITTING SYSTEM AND APPARATUS
Filed Aug. 18, 1928  5 Sheets-Sheet 3
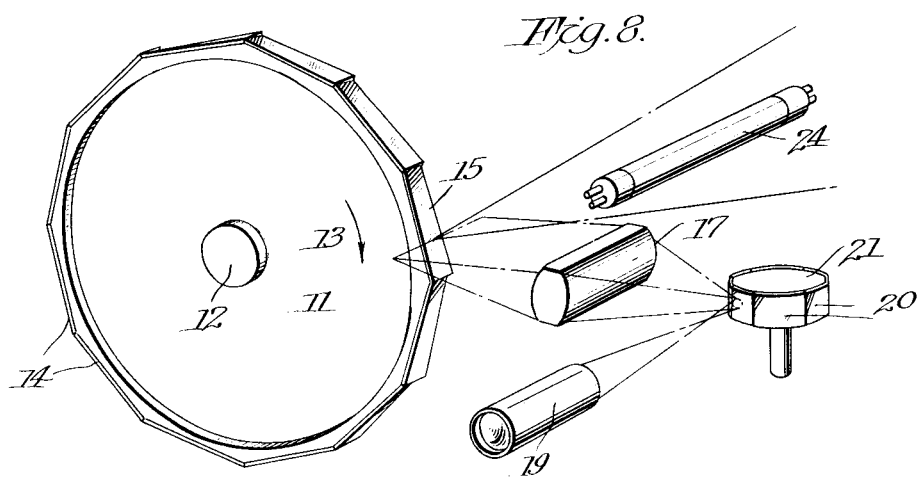
Fig. 8.
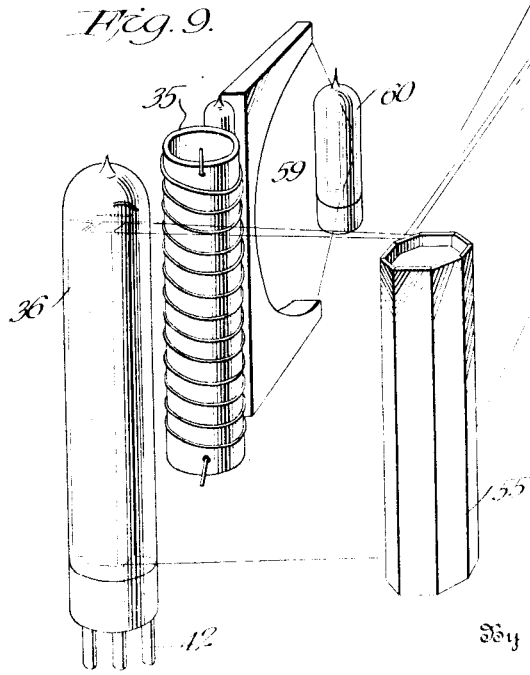
Fig. 9.
Inventor
Elwin L. Peterson,
By Charles E. Ford

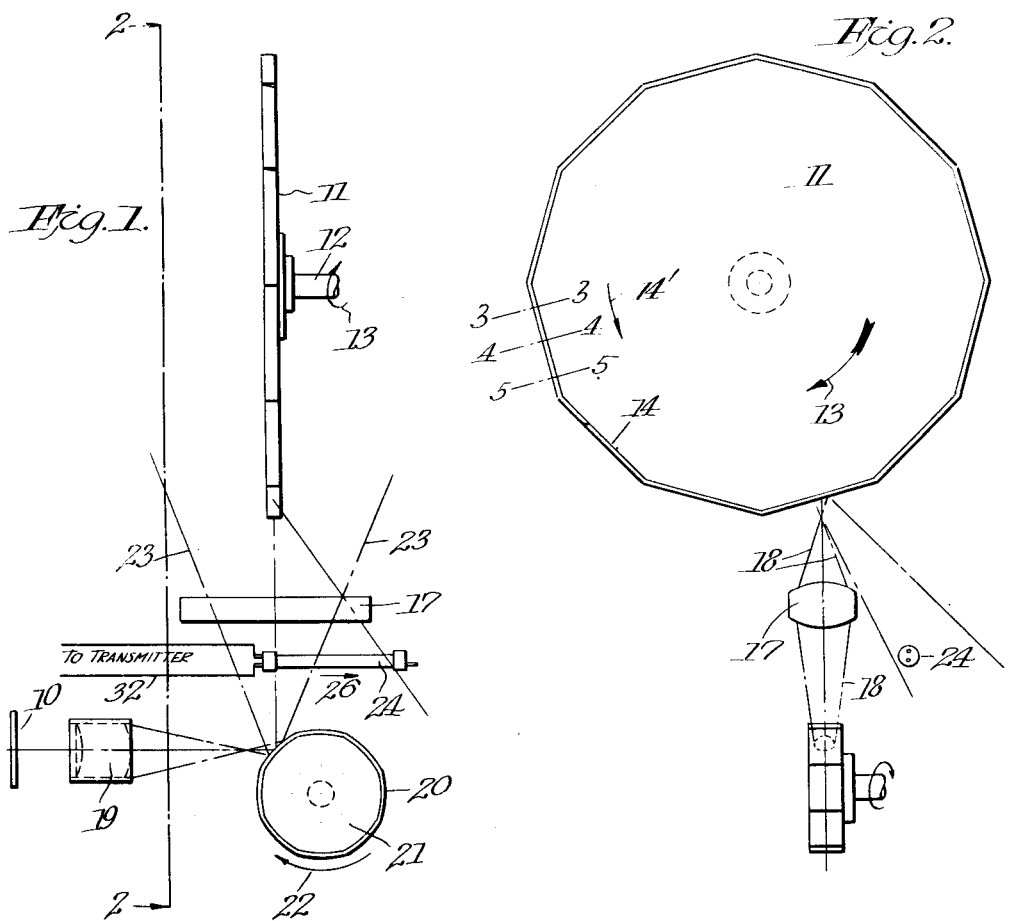

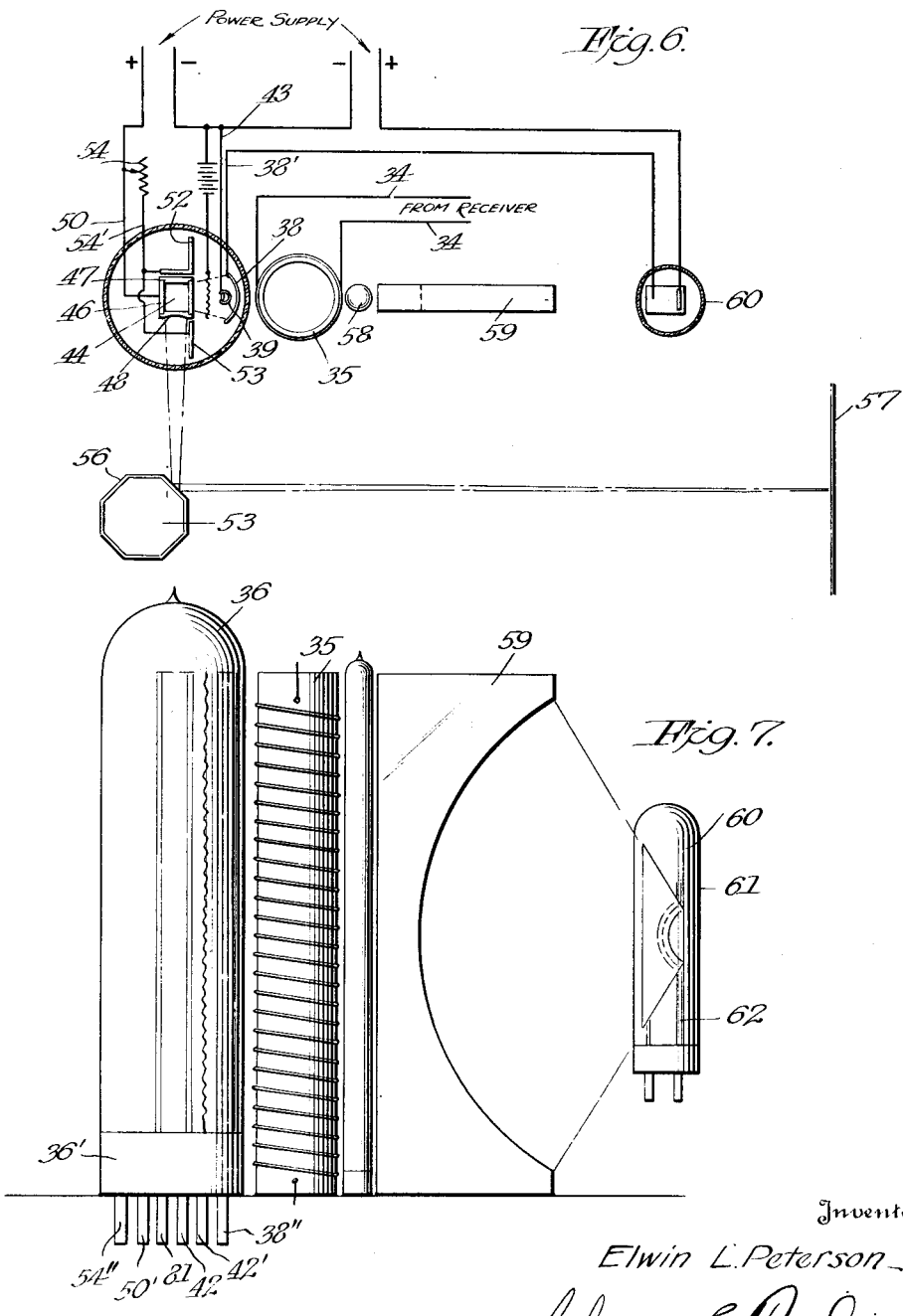

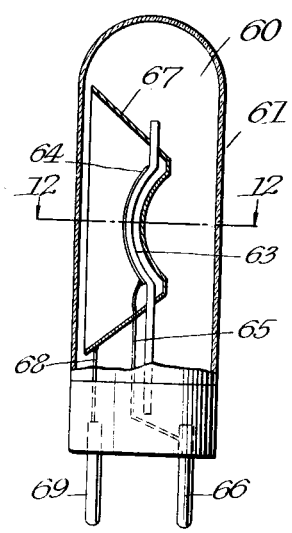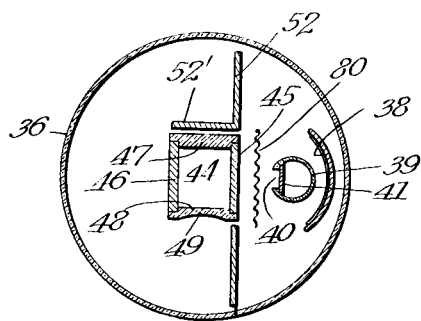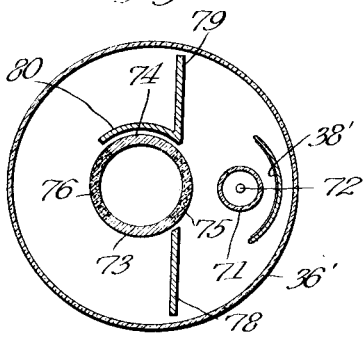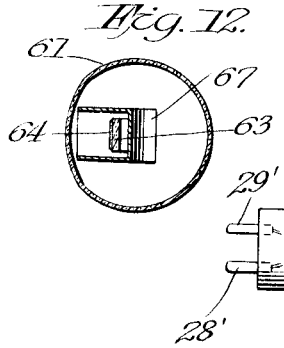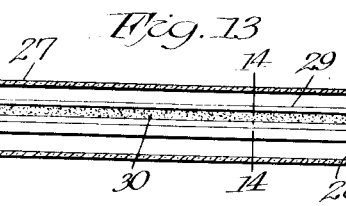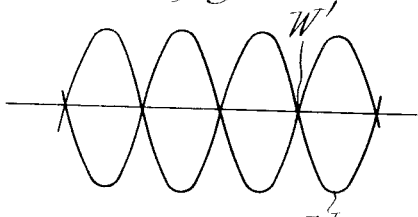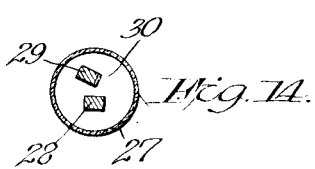

Feb. 18, 1930.  E. L. PETERSON  1,747,791
TRANSMITTING SYSTEM AND APPARATUS
Filed Aug. 18, 1928   5 Sheets-Sheet 5

Inventor
Elwin L. Peterson
By Cushman Bryant
Attorneys

Patented Feb. 18, 1930

1,747,791

UNITED STATES PATENT OFFICE

ELWIN L. PETERSON, OF RIVERSIDE, CALIFORNIA, ASSIGNOR TO RAY-O-VISION CORPORATION OF AMERICA, OF RIVERSIDE, CALIFORNIA, A CORPORATION OF CALIFORNIA

TRANSMITTING SYSTEM AND APPARATUS

Application filed August 18, 1928. Serial No. 300,462.

This invention relates to a method and apparatus intended, primarily, for transmitting vision, although certain phases of the method and parts of the apparatus are applicable to the transmission of sound as well as vision.

Heretofore, methods have been suggested for the transmission of vision, and although there has been considerable variation in the apparatus employed, the method ordinarily has involved the scanning at a transmitting station of a picture, image or object, and the transmission of electrical impulses or waves proportioned in intensity to the intensity of the light emitted by the successive portions of the object, picture or image scanned. The scanning operation has usually been performed by an element which moves relatively to the image or object, the element consisting of a mirror or light reflecting device adapted to direct or reflect light from the various portions of the image in sequence upon a light sensitive means adapted to produce electrical impulses corresponding to the intensity of the reflected light. These impulses, which may be transmitted either by wires or wirelessly, are utilized at a receiving station in connection with a suitable scanning means, for instance, to vary the intensity of a beam of light reflected upon a suitable receiving screen or plate in accordance with the variations in the intensity of received impulses or waves.

In methods heretofore proposed, the variant effects at the receiving end, result from variations in intensity of the transmitted impulses or waves, the variations corresponding to the relative strength of the light rays upon the light sensitive medium at the transmitting end. The waves or impulses transmitted have heretofore been of uniform length in transmitting any given picture, and in such experimental work as has received official cognizance, it has been customary to assign for use in transmitting vision, a specific wave length.

A feature of the present invention is a scanning operation or method which involves the production of electrical impulses or waves of different frequency characteristics or lengths in the transmission of a given image, object or picture. In carrying out this method, the wave lengths i. e., frequency characteristics are preferably proportioned to the creation of each part of the picture being transmitted. The scanning operation preferably also involves a variation in the intensities of the impulses proportional to the intensity of the light rays emitted. The use of this scanning method is not necessarily limited to the transmission of vision, or to use at a transmitting end.

Another feature of the invention consists in a method of scanning which is particularly useful at the receiving station, the method involving the use of the varying wave lengths or wave frequencies received in controlling and varying a visual effect produced thereby such as the location of a beam of light or luminous spot reflected upon a suitable receiving screen or plate. From another aspect, the invention involves the utilization of predetermined portions of the received waves, in the present instance, the nodes, for producing the visual effects desired. From still another aspect, the invention contemplates making use of the changing periods of time which elapse between successive waves; as will be understood, this is produced preferably by changing the wave lengths and by using definite predetermined portions of these changing waves which results in a varying time period elapsing between the transposing of the location of the luminous area. It will be clear that since the wave lengths are being continuously modified, the lapse of time between the reception of, and producing effect by, the predetermined portions of the successive waves will vary. Preferably, the receiving method also utilizes the variations in the intensity of the received waves for varying the intensity of the beam or luminous spot. More particularly, the receiving method employs the electro-magnetic field produced by the waves, by colliding the electrons which are produced in this field, except in the planes or lines of the wave nodes, with an electron flow which is set up in the field. Since the wave nodes are incapable of producing this colliding effect, the variations in the positions of the nodes due to the different lengths of the waves received, result in a differential control of the location of a luminous spot produced by the local flow of electrons. This local flow is produced in the field of the received waves in such a way that the collision of the wave electrons with the flowing electrons will take place in every plane of the flow but that portion corresponding to the planes of the nodes of the received waves. Thus the luminous spot or plane will be produced by the flow of electrons only in the planes of the wave nodes, due to the collision of the wave electrons from other portions of the luminous-area-producing electrons in the local flow. As will be understood, variations in the positions of the wave nodes due to the systematic changes in the lengths of the waves will result in the desired movement of the luminous spot which is confined to the plane of the node.

A still further feature of the invention involves the use of an improved scanning means at the transmitting end, which is adapted to pencil or divide an image or object into elementary or component portions and to reflect each portion upon a light sensitive element or cell in such a way that successive parts of each pencil are imposed upon different parts of the light sensitive element or cell. This cell is responsive at different parts thereof to produce waves or electric impulses of different lengths. The scanning device in the preferred form will comprise a disc-like element having a plurality of circumferentially disposed mirrors, each with a reflecting surface having a lateral angle of inclination which increases circumferentially of the disc, whereby successive portions of each element or pencil are reflected laterally from the plane of the disc gradually increasing distances and upon different and successive portions of the light sensitive element or cell.

Another feature of the invention resides in the means for producing the visual effect at the receiving end, which is varied both in intensity and location by the received waves of different lengths or frequency characteristics and intensities. This luminous beam or spot may be produced within an evacuated tube by means of a light sensitive medium, preferably of curved cross-section, so as to increase the reflecting effect. This light sensitive medium forms a cathode which, when subjected to light rays, is adapted to set up an electron flow toward an anode, the light sensitive cathode and anode both forming part of a circuit having a local source of energy variable in intensity by the varying intensities of the received waves. The light rays imposed upon the cathode are preferably produced within the tube by means of a tube of luminescent gas, which has been found to be particularly useful due to the fact that it may be substantially instantaneously transferred from an active to an inactive state, and vice versa. The anode which will be termed the primary anode, comprises an area of luminescent gas adapted to be made luminous by the flow of electrons through the same from the light responsive cathode. Adjacent this primary anode and more remote from the light sensitive cathode, are one or more secondary anodes also in the wave intensity controlled local circuit, but which will not attract the electron flow unless the flow is diverted in such a way that the secondary anodes become, in effect, closer to the path of electrons. Means is provided for controlling the relative proximity or remoteness of the primary and secondary anodes to the electron flow, this means being preferably a variable resistance in the circuit from the local source of electrical energy adapted to step up or down the electrical charge of the secondary anodes, as desired. By such means, the secondary anodes may, in effect, be placed closer to the path of the electron flow or more remote therefrom, as compared to the primary anode, since the variation in electrical charge is equivalent to changing their location or positions.

The tube containing the light sensitive cathode and anodes preferably contains also a grid interposed between the cathode and anode. The tube is so positioned relative to a wave receiving inductance that the flow of electrons within the tube is normally within the electro-magnetic field of the received waves, thus causing a collision of the electrons from the received waves with the electron flow in all planes except the plane of the nodes of the received waves. In this way, the location of the beam or luminous spot in the anode is varied, since the crests of the waves, by diverting all primary anode illuminating electrons except those in the plane of the node, confine the luminous spot in the primary anode to the plane of the wave node. Since the location of the node varies, in receiving waves of different lengths, the location of the luminous spot within the luminescent area of the primary anode will be varied with the changes of node location.

Intensity of the beam is also controlled by the received waves through a light sensitive element disposed in the local circuit, which produces the electron flow within the evacuated tube.

Although the method contemplates the use of waves of other than a single length, it should be understood that since each slight variation in wave length is utilized, only a very small range of variation is necessary for practicing the method.

The above general features and objects of the invention and others of a more detailed nature, will become clearer as the description proceeds in connection with a preferred embodiment shown in the accompanying drawings, wherein Figure 1 is a partially diagrammatic view of the transmitting apparatus.

Figure 2 is a side elevational view on line 2—2, Fig. 1.

Figures 3, 4 and 5 are cross-sectional views through one of the mirrors on substantially the lines 3—3, 4—4 and 5—5 of Figure 2.

Figure 6 is a top plan view of the receiving apparatus.

Figure 7 is a side elevational view of a portion of the receiving apparatus.

Figure 8 is a diagrammatic perspective of the transmitting apparatus.

Figure 9 is a perspective of the receiving apparatus.

Figure 10 is an enlarged cross-sectional view through a luminous spot producing tube of the receiving apparatus.

Figure 11 is a vertical sectional view of the intensity control light sensitive switch at the receiving end, the base of the tube being shown in elevation.

Figure 12 is a cross-sectional view on the line 12—12 of Figure 11.

Figure 13 is a side elevational view of the light sensitive element shown as employed at the transmitting end.

Figure 14 is a cross-sectional view on the line 14—14 of Figure 13.

Figure 15 is a cross-sectional view of a modified form of tube slightly different from that shown in Figure 10.

Figure 16 is a diagram of one form of wave.

Figure 17:
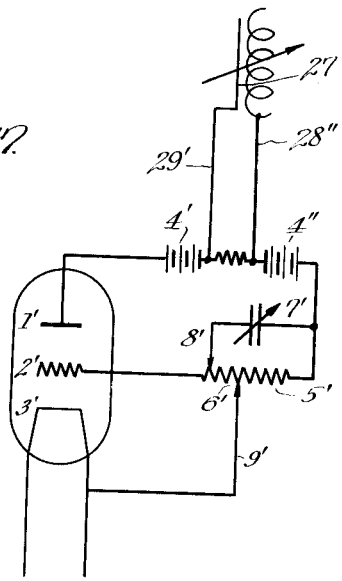
Figure 17 is a circuit diagram showing the light cell or tube 27 connected with a transmitter circuit.

Referring to the drawings for a more detailed description of the method and apparatus, 10 (Fig. 1) indicates a source of light such as an object, image or picture to be transmitted. The illustration of what is to be transmitted is necessarily a diagrammatic one, and as will be understood, it may be either stationary or moving. For convenience, 10 will be termed throughout the following description a "picture", although it is to be understood that this term is used in a generic sense, as explained. The picture 10 is divided into linear component parts or pencils. These linear parts may be of any form and have any desired relation to the picture, and by the terms "pencils" or "pencilling operation", as used throughout the specification and claims, I intend to cover any division of a picture into component parts regardless of the form of such parts or their relation to a complete picture, or to one another.

The pencilling operation is performed, preferably, by means of a rotatable disc-like element 11, arranged in the present instance, on a horizontal axis 12 and rotating in the direction of the arrow 13. The periphery of the disc 11 has disposed thereon a plurality of circumferentially extending reflecting devices 14, such as mirrors. Each mirror has a reflecting surface 15 having a lateral angle of inclination which gradually increases (Figs. 3, 4 and 5) circumferentially, and the present instance, in the direction of the arrow 14' (Fig. 2). The picture 10 in some instances, may be directly presented to the scanning disc 11 through a lens 17, having a vertical plane of curvature, in order to reduce in one dimension the picture elements or parts when imposed upon the mirrors 14, as illustrated by the dotted lines 18 in Fig. 2. Ordinarily, however, it will be found preferable to position the object, as illustrated in Fig. 1, so that the same is directed through a lens 19 upon a plurality of mirrors 20, each arranged on the periphery of a wheel or element 21 rotatable upon a vertical axis in the direction of the arrow 22. Each mirror 20 has a reflecting surface curved on a radius not less than the radius of the wheel 21, and this surface serves to spread out the image in one dimension, in the present instance a horizontal dimension, as illustrated by the lines 23 (Fig. 1).

Having been spread out in a horizontal dimension, the image is transmitted through the lens 17, which though not affecting the horizontal spread, serves to reduce the image in another dimension (vertical) at a substantially right angle to the dimension in which the mirrors 20 spread the image. The horizontally spread, but vertically reduced, image or picture, is thus impressed pencil by pencil or progressively, as wheel 21 rotates slowly, upon the mirrors of the scanning disc 12, and since the latter is rotated at a speed greatly in excess of the speed of rotation of the element 21, each complete image which is directed toward the mirrors 14 of disc 11 is pencilled in substantially vertical planes. As the disc 11 rotates rapidly, it pencils the image directed toward its mirrors by the slowly moving mirrors 20, which slowly move the picture across the plane of rotation of disc 11 to present successive parts or pencils of the picture or image to the succeeding mirrors 14, which pencil the image.

The rotation of the disc 11 causes each mirror to reflect its pencil toward a light sensitive element or cell 24, the position of which with reference to the mirrors 14 is accurately selected in order to employ the effect of lateral angle of inclination of the reflecting surfaces 15. When the light sensitive element 24 which will be termed a cell, although by the term "cell" is meant any light sensitive device, is positioned as illustrated in Figs. 1 and 2, rotation of the scanning disc 11 will cause each mirror to impose its pencil upon the cell 24. Due to the rotation of the disc 11, successive parts of each pencil will be imposed upon the cell and the increasing lateral angle of inclination of the surfaces 15 of the mirrors 14 will cause the successive portions of each pencil to be imposed upon successive portions of the light sensitive medium longitudinally thereof, as illustrated by the arrow 26 in Fig. 1. Thus, it will be understood that each pencil is, so to speak, moved both transversely and longitudinally of the cell 24, whereby successive portions of each component part or pencil are presented to successive and different parts of the cell 24. Since each mirror 14 forms a different pencil of the picture which is being moved across the plane of rotation of the disc 11 by the wheel 21 it follows that the various pencils, which are substantially uniform component parts of the image will each be imposed upon the light sensitive cell 24 in substantially the same manner. That is to say, successive portions of each pencil will be presented to successive portions of the cell 24, and, furthermore, any selected point in any pencil will be imposed upon the light sensitive element at exactly the same point of the cell as the corresponding point in any other pencil. Since a point in any pencil is located in a plane through the picture in one direction, it follows that all points in a given plane in that direction transversely of the pencils, will be imposed upon the light sensitive element at exactly the same point therein.

The foregoing description of the scanning means which may be utilized will be understood to be merely an example of a suitable type of scanning means, and the invention is not, of course, to be limited to this particular type of scanning means in so far as the generic aspects of the invention are concerned, for obviously scanning means such as has been heretofore used in the art might be employed for the purpose of modulating the response of the light sensitive cell so as to produce waves of varying frequencies or lengths. The scanning device may, of course, be of any suitable arrangement which will accomplish this result. The scanning may be in diagonal order, if so desired, instead of in vertical lines described. Since scanning means of this type are old and well known in the art, further description is thought to be unnecessary.

The light sensitive cell is formed so that it is responsive, by either resistance or inductance, at different parts thereof to produce electrical impulses or waves of different lengths. Therefore, due to this characteristic of the light responsive cell, succeeding portions of a pencil will produce waves of different lengths and, of course, the intensity of each wave will vary in accordance with the intensity of the light rays emanating from different parts of the picture or object. Since the pencils are formed in the same way, corresponding points in the different pencils (and by corresponding is meant for instance equi-distant points from the ends of the respective pencils, and in the same plane of the object taken transversely of the pencils) will produce the same wave length, although the intensity of such waves may vary, due to the variable intensities of the rays which may emanate from such corresponding points in the pencils.

Obviously, the relation of the pencils to the image transmitted may be varied by obtaining a different relative movement between the scanning element and the picture or image. In the preferred form illustrated, however, it will be understood that each wave length is proportioned to the position in the object or picture of that part producing the ray imposed upon the light sensitive element. Moreover, the intensity of the wave length is proportioned to the intensity of the ray.

The light sensitive cell is placed in circuit with any suitable transmitting device, and since such devices are old and well known, it is thought unnecessary to describe their construction or to illustrate in detail the circuit connection of the light sensitive element 24 therewith.

In actual practice I have used with satisfactory results short waves e. g. waves of from ten to forty meters, with many types of tuned circuits having regular characteristic curves of efficiency. When a tube circuit is used, it has been found preferable to connect the cell into the plate circuit and to include a battery or other source of power sufficient to keep charged both electrodes 28, 29 of the cell with the right charge. A suitable tube circuit adapted for such use is illustrated, for example, in the patent to Loewe, 1,649,122, granted November 15, 1927. From the transmitter, the impulses or waves travel to a receiving apparatus, a preferred form of which will later be described.

The character of the light sensitive cell or element 24 may vary considerably but for purposes of illustration, I have shown one type which has been found to be satisfactory. Referring to Figs. 1 and 13, a translucent evacuated tube 27 contains a plurality of longitudinally extending conducting elements 28, 29, the latter being arranged, as shown in Fig. 14, at an angle so that its light sensitive coating 30, which may be an alkali substance such as potassium or other material of similar characteristics, is exposed to the uncoated element 28. If the light responsive element is to be connected with the transmitter as a resistance, contacts 28', 29' at one end of the conducting elements which are spaced apart throughout their length, and also at their other end, may be connected to leads 32 (Fig. 1). Because the cell when used as a resistance is of limited capacity in the production of different shades without losing proper scanning power, it has been found preferable to connect up the element with the transmitter as an inductance, and in such event, a terminal 28″ at the opposite end of one of the conductors, in the present instance, the conductor 28, is connected to one lead and the terminal of the other conductor connected to the other lead. When an inductance cell is used it is desirable that one of the electrodes 28 or 29 have more or less inductive power than the other; for instance, the electrode 28 may be a coiled or stranded wire instead of the solid cross sectional form as illustrated. The light sensitive element shown in Figs. 1 and 13 is formed so that it may be employed either as in inductance or resistance, as desired. Figure 17 shows the cell 27 connected as an inductance with a suitable circuit of the character shown in the patent to Loewe, 1,649,122, granted November 15, 1927. As described in said patent 1′ represents the anode, 2′ the grid and 3′ the incandescent cathode of the vacuum tubes or any other source of electrons. The passage is from the anode over the anode battery 4′, the inductance cell 27, the battery 4″, then to a coil 5′ and finally to the incandescent cathode 3′. The grid is connected up to a coil 6′ and a variable condenser 7′ is used to regulate the number of oscillations. As explained in said patent, the connection renders it possible for a range of wave lengths to be varied considerably and is particularly suitable for the production of very short waves, by reason of the fact that the mutual capacity of the coils 5 and 6 is greatly reduced when they constitute portions of an auto-transformer. The points of connection 8′ of the condenser and 9′ of the wire to the cathode can be moved in order to secure the proper result. Further description of the transmitter circuit is thought unnecessary in view of the fact that the same corresponds to that shown in the above mentioned patent with the exception of the cell 27 into the plate circuit and the use of the additional battery 4″. It is understood that the two batteries 4′ and 4″ maintain properly charged the two electrodes of the inductance cell 27, and also that the lead 29′ is to the light sensitive electrode and that the two leads 29′, 28″ connect with electrodes of different inductive capacity. This circuit is described merely for example and obviously may be varied considerably; others may be found more effective.

Figure 18:
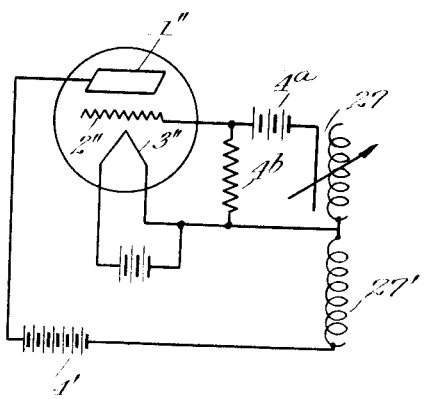
Figure 18 is a circuit diagram showing the light cell or tube 27 in a slightly different form of circuit.

Figure 18 shows the cell 27 connected with a slightly different form of circuit. In this figure, 1″ represents the anode, 2″ the grid and 3″ the incandescent cathode of the vacuum tubes or any other source of electrons. The passage is from the anode over the anode battery 4′, an inductance 27′ and then to the incandescent cathode 3″. The grid 2″ is connected with the battery 4ª and the inductance cell 27, and a resistance 4ᵇ, is connected between the grid and the other side of the cell 27, which is connected with the cathode. It will be understood, of course, that some circuits will be found preferable to others, and that the invention is not limited in any sense to the circuits illustrated and described, which are merely given by way of example. Under some circumstances, it may be found that other circuits will give superior results.

Before describing the receiving end, it will be understood, as explained above, that the invention is not limited to the use of the wheel 21, and that in some instances, such as in the use of a moving picture film, it may be preferred to dispose the picture so that it is directly transmitted to the scanning disc 11 through the lens 17. Obviously, if a moving picture film is to be scanned, it will be fed, as are the mirrors 20, so as to carry the successive images or pictures across the plane of rotation of the scanning disc 11.

The waves of varying lengths or frequencies and intensities which are transmitted, may be received upon a suitable receiving apparatus of conventional character, the nature of which will vary depending upon whether the transmission is by wire or wirelessly, although the latter is preferred in order that at the receiving end, there may be employed a vision producing apparatus of the character now to be described. Assuming that the waves transmitted are of varying lengths and intensities, as described, and that they have been received upon a conventional receiving apparatus, they are transmitted through leads 34 (Fig. 6) to an inductance element 35. Typical waves are outlined in Fig. 16, and have, as will be understood, crest portions W and nodes W′. At all points other than the nodes, the waves form an electro-static field and therefore an electro-magnetic field, the force of which is substantially torsional or circular in counter-directions, as well as longitudinal. But in the planes of the nodes there is no electro-magnetic field. Since the waves vary in length, as received by the inductance element 35, the plane (substantially horizontal) of the node (Fig. 7) will move lengthwise of the inductance element (Fig. 7). The waves set up around the inductance element an electro-magnetic field which, roughly speaking, is of circular or torsional outline. Within this field at one side of the inductance element is arranged a means adapted to produce under the influence of the received waves a luminous spot or area; in the present instance there is provided a tube 36, which preferably is evacuated. The tube contains an anode in the form of a vertically extending base or support 37 having a concave face coated with light sensitive material 38 (Fig 10), such as an alkali substance, which is disposed in a local circuit through a lead 38' and contact 38" in the base of the tube. The coated face is concave so as to produce a reflecting effect. Within the tube is also arranged a means for imposing light rays upon the light sensitive coating 38 and which means I have found should be of a character which may be changed substantially instantaneously from an active to an inactive state and vice versa. I have discovered that a luminescent gas, such as neon, arranged within a tube 39, has to a very effective degree the characteristic that it may be made active and inactive substantially instantaneously. In order to secure this effect, the tube 39 has arranged at one side thereof, closing a longitudinal opening 40 therein, a metallic conducting strip 41 which interiorly of tube 39 is exposed to the neon and exteriorly of tube 39 is exposed to the interior of the tube 36 through the opening 40 in the neon tube 39.

By means of a contact terminal 42 (Figure 7) the strip 41 may, through a lead 43, be connected with a local source of electrical energy, as illustrated in Fig. 6. This electrical charge will cause the plate 41 to emit electrons within the tube 30 and to make the neon gas therein luminous. If desired, a second contact 42' for the strip 41 may be provided to connect the top of the strip with the lead 28' to light sensitive coating 38. The light rays of the luminous tube 39 striking the light sensitive coating 38 of the cathode plate, will cause the same to emit a flow of electrons, which flow will be supplemented by a flow of electrons from the exposed surface of strip 41 (Fig. 10) toward and through a primary anode 44. The primary anode 44 has a wall 45 and a second wall 46 parallel thereto; these walls being formed of conducting material. The walls 45, 46 are spaced by lateral walls 47, 48, the wall 48 being of translucent character, and preferably having a lens formation, such as a concave outer surface 49. The anode thus formed is filled with luminescent gas, such as neon, adapted to be made luminous by the electron flow travelling from the cathode 38 and from the strip 40 within the ray producing tube 39. This electron flow is adapted to make luminous all the luminescent gas in the primary anode which is placed in the local circuit through lead 50 (Fig. 6) connected with a contact 50' at the base 36' of the tube 36. The contact 50' is conductively connected to the wall 46 and the latter, through the neon, with the wall 45. One or more secondary anodes 52, 53 are disposed within the tube 36 and are arranged so that during the normal flow of electrons from the cathode, they will not serve to divert or attract the electrons from their normal path through the primary anode which they serve to make luminous. As illustrated in Fig. 6, the secondary anodes are in the same transverse plane with the face 45 of the primary anode but being laterally spaced from the face 45, which is directly in front of the cathode, the secondary anodes are more remote from the normal electron flow. If under certain circumstances, the secondary anodes are found to be insufficiently remote from the electron flow, as compared to the primary anode, their remoteness may be increased by stepping down their electrical charge through the variable resistance 54, which through lead 54' and the base contact 54" of the tube is in circuit with the secondary anodes. The secondary anode 52 has a portion 52' vertically coextensive with wall 47 of the primary anode and serving to prevent discharge of light rays through wall 47 when the latter is of glass. The portion 52 may have a reflecting coating on its surface facing wall 47. If desired, the tube may also have positioned therein a grid 80 disposed between the cathode and primary anode and placed in the local circuit through tube base contact 81 and lead 82. This grid, which may be of conventional form, in some instances will strengthen the reproduction. It will be understood, therefore, that the question of comparative remoteness of the primary and secondary anodes from the flow of electrons is not one of position or location solely, and that where the term "remote" is used in the specification and claims, its sense is not solely one of position, but of relative electron attractive strength of the primary and secondary anodes.

When the rays from the tube 39 act upon the light sensitive coating 38 of the cathode, and produce a flow of electrons to and through the primary anode, the latter will be made luminous throughout. However, the waves received by the inductance 35 form an electro-magnetic field, within part of which field the flow of electrons is arranged. As a result, the wave electrons collide with the electron flow in the tube 36 and divert from their normal path through the primary anode, all electrons, except those in the plane of the wave node which has no such electromagnetic effect. Thus, the electrons thrown out by the crests of the waves, in fact by all parts thereof except the nodes, collide with the electrons flowing between the cathode 38 and primary anode and divert from their normal path all electrons except those in the node plane. It will be understood, of course, that by reference to the "plane" of the node, I do not mean exactly a "plane", and that this term is used in a generic sense to denote a limited area, which, roughly speaking, may be termed a plane.

Upon being diverted from their normal path in the tube, the electrons immediately become closer to the secondary anodes 52 and 53 than to the primary anode. In other words, this diversion of the electrons from their normal path makes the secondary anode more proximate to the electron flow than the primary anode. However, the electron flow within the plane of the node continues onto and through the primary anode and produces therein a luminous spot or plane, the position of which within the luminescent area or anode, will vary as the position of the node varies. The node position will vary vertically or longitudinally of the primary anode, due to the fact that the waves are received variant lengths.

Although particular means for producing the luminous area is shown as an evacuated tube, it will be understood, of course, that any means suitable for this purpose may be employed in carrying out the method, and this applies as well to other parts of the apparatus which have been particularly described.

It will be understood that since a predetermined portion of each wave is being utilized, i. e., in the present instance, the node, and since the waves are changing in lengths, there will be varying intervals of time between the reception of successive wave portions, and consequently varying intervals of time between the moving of the luminous area. The luminous spot produced is explored by a rotating element 55 through the side face 49 of the primary anode, and the mirrors 56 upon the element 55 reflect the rays upon a screen 57, which may be of any suitable material. The mirrors 56 will be continuously rotated by suitable means (not shown) preferably at a speed corresponding to the speed of the wheel 21 at the transmitting end. If the wheel 21 is not employed the element 55 will be moved to present one of its mirrors 56 to the beam source or anode for each complete picture presented to the scanning disc 11. The speeds may be synchronized, if desired, by suitable means which forms no part of the invention disclosed in this particular application.

From the foregoing description, it will be apparent that the scanning apparatus at the receiving end utilizes the variations in the position of the nodes of the received waves to vary the position of a luminous spot or beam which is continuously transmitted, as varied, through the directing mirrors 56 to the reproducing screen 57. The position of the luminous spot will vary in accordance with the wave lengths, and these wave lengths are proportioned to the positions of the parts on the picture transmitted. In order to vary the intensity of the luminous spot and beam therefrom, a light ray producing means, such as a luminescent tube 58, may be positioned within the field of the received waves so as to be made luminous by inductance. The rays from the tube 58 are reflected through a lens 59 upon a light sensitive cell 60, which is in the circuit supplying the local source of potential for the elements in the tube 36. Unless this circuit is closed through the light sensitive element or cell 60, there can be no flow of electrons in the tube 36, and when the circuit is closed through the cell 60, the intensity of the local charge will vary in accordance with the intensity of the light rays emanating from the tube 58, which closes the circuit at the light sensitive cell 60. Moreover, since the luminescent tube 58 is made luminous by the received waves, the intensity of its rays will be directly in proportion to the intensity of the received waves. Consequently, the energy of the local source of potential for producing the electron flow within tube 36, is directly dependent upon the intensity or energy of the received waves, and since the wave intensities vary in accordance with the varying intensities of the light rays at the transmitting end, the intensity of the local source of potential producing the electron flow within the tube 36 and the resulting intensity of the luminous spot in the primary anode will correspondingly vary.

The sensitive cell 60 may be of various constructions, but in the drawings I have shown a preferred form which comprises a tube 61, preferably evacuated, and having a support or base 62 of glass or other suitable material, which at 63 is convexed and provided with light sensitive coating 64 having associated means, such as the lead 65, and contacts 66, for placing the coating in the electrical circuit forming the local source of potential. The convex curvature of the coating is so produced in relation to the imposed rays that the path of the rays will be substantially normal (right angle) to the coating surface. An electron collecting hood 67 surrounds the coating 64, but is not in electrical contact therewith. This hood is adapted to be placed in the circuit through the lead 68 and contact 69, the latter being positioned in a base 70 of the tube with the contact 66. Rays from the tube 58 imposed upon the light sensitive coating 64 will set up an electron flow from the coating to the hood and establish a circuit between the coating and the hood which collects these electrons. Thus, the circuit in which the contacts 66 and 69 are connected will be closed across the coating 64 and hood 67. The electron discharge of the coating 64 will vary in accordance with the intensities of the light rays from the tube 58, and thus the energy of the local source of potential will vary in accordance with the flow of electrons which establish the circuit. Obviously, the construction of this tube may be varied considerably without departing from the invention.

Referring to Fig. 15, there is shown a modified type of electron flow tube somewhat similar to the tube 36 previously described. The construction of the parts within this tube 36' will be similar to that of the tube 36 except in so far as differently illustrated in this view.

The anode coating 38′ is adapted to receive light rays from a gas filled luminescent tube 71, which has enclosed therein the electrode 72 adapted to receive an electrical charge through a contact in the base similar to the contact 42 of the base 26. The primary anode 73 is in the form of an integral tube having translucent portions 73, 74, and front and rear conducting portions 75, 76 formed as by incorporating in the glass or other material, from which the anode is formed, a suitable material, such as metal fragments or the like. It will be understood that the metallic portions 76 of the anode may be placed in a local circuit in the same manner as the wall 46 of the tube 36. Secondary anodes 78, 79 are arranged in suitable portions, and the anode 79 has a laterally extending wall 80 which closes the translucent portion 74 of the primary anode so as to cause all the light to be reflected through the portion 73. It is believed that no further description of this form of tube is necessary, since, as stated in other respects it corresponds exactly to the tube 36. "Successive waves" is used in the claims in a broad sense to distinguish from simultaneously transmitted waves and is not to be limited to a change in each immediately following wave since a certain number of waves may be of substantially the same length. By "progressive" change of wave lengths is meant either increase or decrease in length.

It will be understood that although I have described in detail a preferred form of receiving apparatus, the invention is not to be limited to this particular type of apparatus, since any means adapted to utilize the varying frequency characteristics of the received waves to produce correspondingly varying visual effects will accomplish the desired object. In its broader aspects the receiving method contemplates merely the use of means which will produce visual effects which vary, preferably in location, in accordance with the varying frequency characteristics or lengths of the received waves. Obviously, means differing in very substantial respects from the means disclosed in detail in this application may be utilized for this purpose.

Obviously, the invention is not limited to the details of construction described, and it will be understood that numerous modifications may be made in both the method and apparatus without departing from the invention, certain features of which are set forth in the following claims.

I claim:—

1. The method of wave transmission which consists in changing the lengths of waves transmitted in proportion to the effect desired and utilizing at a receiving station the changing characteristics of predetermined parts of the received waves to determine desired positions.

2. The method of wave transmission which consists in changing the lengths of the waves transmitted in proportion to the effect desired, and utilizing at a receiving station the varying nodes of the waves of different lengths to determine desired positions.

3. The method of wave transmission which consists in changing the lengths of the transmitted waves through a progressive scale, and utilizing at a receiving station the changing characteristics of predetermined parts of the received waves to determine desired positions.

4. The method of wave transmission which consists in changing the lengths of the transmitted waves through a progressive scale, repeating said scale, and utilizing at a receiving station the changing lengths of the received waves to determine desired positions.

5. The improved method of transmitting which consists in penciling an object to be transmitted and sending each pencil by a series of different waves progressively varying in length in each pencil.

6. The improved method of transmitting which consists in penciling an object to be transmitted and sending each pencil by a series of different wave lengths, and uniformly varying the lengths of the waves of the different pencils.

7. The improved method of transmitting which consists in penciling an object to be transmitted and sending each pencil by a series of different wave lengths, and uniformly varying the lengths of the waves of the different pencils through substantially the same range of wave lengths.

8. The improved method of transmitting which consists in penciling an object to be transmitted and sending each pencil by a series of different wave lengths, and varying the lengths of the waves of the different pencils through substantially the same range.

9. The method of scanning which consists in producing successive waves in response to light rays emanating from successive points of an object and changing the lengths of the successive waves in response to the different location of ray emanating from the different points of the object.

10. In the art of transmitting vision the improved method which consists in successively producing by rays emanating from different and successive points in an object to be transmitted electric waves of different lengths and changing the lengths of the waves in accordance with the plane in the object from which the rays emanate.

11. In the art of transmitting vision of an object, the method which consists in utilizing light rays emanating therefrom to produce electrical waves and changing the lengths of the waves as portions of the object in different planes are transmitted whereby the lengths of the waves are proportioned to the plane in the object from which the rays emanate.

12. In the art of transmitting, the method which consists in utilizing rays of light emanating from an object to produce electrical waves in accordance with the plane in the object from which the rays emanate in such a way that succeeding points of an object in one plane are transmitted by the same wave lengths.

13. The method of sending which consists in producing electrical waves and changing the lengths of the waves in accordance with the plane in such a way that succeeding points in one plane are transmitted by a scale of wave lengths proportioned in length to the location of the respective points in said plane.

14. The method of sending which consists in producing electrical waves and changing the lengths of the waves in accordance with the plane being transmitted in such a way that succeeding points in said plane are transmitted by waves which vary through a range in which the individual waves are proportioned in length to the location of their corresponding points in the plane.

15. In the art of transmitting vision of an object, the method which consists in progressively utilizing rays of light emanating therefrom to produce successive electrical waves and changing the lengths of the waves in accordance with the plane in the object from which the rays emanate in such a way that succeeding points of an object in one plane are transmitted by wave lengths which vary progressively in length.

16. In the art of transmitting vision of an object, the method which consists in utilizing rays of light therefrom to produce electrical waves and changing the lengths of the waves in accordance with the plane in the object from which the rays emanate in such a way that succeeding points of an object in one plane are transmitted by varying wave lengths, and all points in a plane at an angle to the first mentioned plane are transmitted by substantially the same wave length.

17. In the art of transmitting vision, the method of scanning which consists in penciling an object, and producing by each pencil a scale of succeeding wave lengths varied for successive portions of the pencil.

18. In the art of transmitting vision, the method of scanning which consists in penciling an object, producing by each pencil a scale of wave lengths varied progressively for different portions of the pencil, and repeating said scale for each successive pencil whereby corresponding points in the different pencils are transmitted by substantially the same wave lengths.

19. In the art of transmitting vision, the method of sending which consists in submitting light rays emanating from different portions of an object to be transmitted to a light responsive medium, producing different wave lengths in response to light rays emanating from different portions of the object, said wave lengths being varied through substantially the same scale for parallel planes of the object, but being of uniform length for points in a plane at an angle to said parallel planes.

20. In the art of transmitting vision, the method of sending which consists in submitting light rays emanating from different portions of an object to be transmitted to a light responsive medium, producing successive and different wave lengths in response to light rays emanating from different portions of the object, said wave lengths being varied through a scale for parallel planes of the object but being of uniform length for point in a plane intersecting said parallel planes.

21. The method of transmitting vision which consists in directing light rays from an object upon a light responsive medium capable of producing different wave lengths for different points of the object, and varying the lengths of the waves progressively for succeeding points in one plane of the object, and repeating said variation for parallel planes.

22. The method of sending which consists in progressively directing light rays from different points of an object upon a wave producing medium capable of producing successive waves, and as different points of the objects are transmitted varying the lengths of the waves in accordance with the location of the points therein.

23. The method of scanning at a receiving station which consists in utilizing the varying characteristics of predetermined parts of received waves to determine and vary the location of a luminous area.

24. The method of scanning at a receiving station which consists in providing a field of electron discharge and utilizing the varying lengths of received waves to modify the path of electrons in said field.

25. The method of scanning at a receiving station which consists in providing a field of electron discharge and creating a luminous area thereby, and utilizing the varying lengths of received waves to modify the path of electrons in said field and to determine and change the location of said luminous area.

26. The method of regulating at a receiving station which consists in utilizing the varying characteristics of predetermined parts of received waves of changing frequency characteristics to determine and change positions.

27. The method of regulating at a receiving station which consists in utilizing the variations in the nodes of received waves of varying lengths to determine and change positions.

28. The method of regulating at a receiving station which consists in creating a luminous area and utilizing the variations in the nodes of received waves of varying lengths to determine and change positions of said luminous area.

29. In the art of transmitting vision, the method which consists in producing by the effect of light rays from the object being transmitted waves of different lengths from different parts of the object being transmitted, and producing at the receiving end light rays variable in accordance with variations in the nodes of the received waves.

30. In the art of transmitting vision, the method which consists in producing by the effect of light rays from the object being transmitted waves of different lengths from different parts of the object, and producing at the receiving end light rays variable in accordance with variations in the nodes and intensities of the received waves.

31. In the art of transmitting vision, an apparatus for scanning having means for directing light rays being transmitted, and means for producing from said rays waves of different lengths and for automatically changing said lengths.

32. In the art of transmitting vision, receiving apparatus for waves of varying lengths comprising scanning means controlled by the varying nodes of the received waves.

33. In the art of transmitting vision, the method of scanning which consists in controlling the location of a luminous spot at the receiving end in accordance with variations in the location of the nodes of received waves of varying lengths.

34. The improved method in the art of transmitting vision which consists in forming a plurality of pencils of an image and moving each pencil simultaneously both transversely and longitudinally of a light responsive element capable of producing energy impulses whereby different transverse planes of the pencil are imposed upon different transverse planes of said element.

35. In the art of transmitting vision, the method of regulating the lengths of the transmitting waves which consists in moving a pencil of an image relative to a light responsive element so that different portions of the pencil are imposed upon differently responsive portions of the element.

36. In the art of transmitting vision, the method of regulating the lengths of the transmitting waves which consists in moving a pencil of an image relative to a light sensitive element so that different transverse portions of the pencil are imposed upon differently responsive portions of the element.

37. The improved method in the art of transmitting vision, which consists in sending waves of varying lengths and at the receiving end utilizing the variations in the nodes of the received waves to control a luminous spot in a luminescent area.

38. The improved method in the art of transmitting vision, which consists in sending waves of varying lengths and at the receiving end utilizing the variations in the nodes of the received waves to control the position of a luminous spot in a luminescent area.

39. In the art of transmitting vision, the method of reproducing an image at the receiving end, which consists in providing a luminescent area, directing by means of a local source of energy toward said area electrons adapted to make luminous substantially the entire area and utilizing the electromagnetic force of received waves to render non-illuminating all electrons except those directed toward a portion of the area in the plane of the nodes of the waves.

40. In the art of transmitting vision, the method of reproducing an image at the receiving end, which consists in providing a luminescent gas filled area, directing by means of a local source of energy toward said area electrons adapted to make luminous the gas of substantially the entire area and utilizing the electro-magnetic force of received waves to render non-illuminating all electrons except those directed toward a portion of the area in the plane of the nodes of the waves.

41. In the art of transmitting vision, the method of reproducing an image at the receiving end, which consists in providing a luminescent gas filled area, directing by means of a local source of energy toward said area electrons adapted to make luminous the gas of substantially the entire area and utilizing the electro-magnetic force of received waves to divert from said area all electrons except those directed toward a portion of the area in the plane of the waves.

42. The method of transmitting pictures which comprises selecting successive portions of a source of light variations, utilizing the selected portions to produce waves of different frequencies, and changing the frequencies for each linearly successive portion of the source of light variations.

43. The method of transmitting pictures by waves which comprises selecting different portions of a source of light, utilizing the different portions for producing waves having changing frequency characteristics and successively changing the frequency characteristics of the waves for linearly successive portions of the light source.

44. The method of transmitting pictures by waves which comprises selecting different portions of a source of light, utilizing the different portions for producing waves having changing frequency characteristics and continuously changing the frequency characteristics of the waves for linearly successive portions of the light source.

45. The method of transmitting and receiving pictures which consists in producing signalling energy having periodically varying frequency portions corresponding to the different portions of a source of light, receiving said varying frequency values and producing a visible response thereto, and varying the location of the response dependently upon and in accordance with variations of frequency of the received waves.

46. The method of transmitting and receiving pictures which consists in producing signalling energy having periodically varying frequency characteristics corresponding to different portions of a source of light, receiving said varying frequency values and producing a visible response, and varying the location of response in accordance with variation of frequency of the received waves.

47. The method of transmitting and receiving pictures which comprises producing a signal having a periodically varying frequency corresponding to respective areas of a transmitted picture, receiving said periodically varying frequencies and varying in position visible effects in accordance with variations in the received frequencies.

48. The improved method of transmitting pictures which comprises transmitting signal energy of varying frequency for different parts of a picture to be transmitted, and controlling the variations so that the frequency varies for each linearly successive portion of the picture transmitted.

49. The method of receiving signalling energy of variable frequency in which the variations correspond to different portions of a picture transmitted which comprises governing and changing positions by the received waves in accordance with the variable frequencies.

50. The method of receiving signalling energy of variable frequency in which the variations correspond to different portions of a picture transmitted which comprises producing visual light effects by the received waves and varying the location of said effects in accordance with the variable frequencies.

51. The method of utilizing signalling energy in the form of waves in picture transmission which consists in varying the time elapsing between the reception of successive predetermined portions of received waves by changing the frequencies of the successive waves and utilizing said portions to determine desired positions at a receiving station.

In testimony whereof I have hereunto set my hand.

ELWIN L. PETERSON.